United States Patent
Von Emden et al.

(10) Patent No.: US 11,858,360 B2
(45) Date of Patent: Jan. 2, 2024

(54) METHOD FOR OPERATING AT LEAST ONE ELECTRICAL COMPONENT OF A VEHICLE

(71) Applicant: Robert Bosch GmbH, Stuttgart (DE)

(72) Inventors: Walter Von Emden, Eningen Unter Achalm (DE); Joachim Joos, Gerlingen (DE); Johannes Grabowski, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/266,885

(22) PCT Filed: Aug. 9, 2019

(86) PCT No.: PCT/EP2019/071452
§ 371 (c)(1),
(2) Date: Feb. 8, 2021

(87) PCT Pub. No.: WO2020/043464
PCT Pub. Date: Mar. 5, 2020

(65) Prior Publication Data
US 2021/0309115 A1    Oct. 7, 2021

(30) Foreign Application Priority Data
Aug. 30, 2018   (DE) .......................... 102018214772.8

(51) Int. Cl.
*B60L 50/60* (2019.01)
*H02J 7/00* (2006.01)
*B60L 58/12* (2019.01)

(52) U.S. Cl.
CPC .............. *B60L 50/60* (2019.02); *B60L 58/12* (2019.02); *H02J 7/0013* (2013.01); *H02J 7/0029* (2013.01); *B60L 2240/527* (2013.01)

(58) Field of Classification Search
CPC .... B60L 50/60; B60L 58/12; B60L 2240/527; H02J 7/0013; H02J 7/0029
(Continued)

(56) References Cited

U.S. PATENT DOCUMENTS

2009/0102422 A1* 4/2009 Naganuma .............. B60L 58/15
                                                                  320/118
2012/0025768 A1   2/2012 Nakano et al.
(Continued)

FOREIGN PATENT DOCUMENTS

DE   102010041009 A1   3/2012
DE   102010041029 A1   3/2012
(Continued)

OTHER PUBLICATIONS

International Search Report for PCT/EP2019/071452, dated Nov. 7, 2019.

*Primary Examiner* — Daniel Kessie
*Assistant Examiner* — Dru M Parries
(74) *Attorney, Agent, or Firm* — NORTON ROSE FULBRIGHT US LLP; Gerard A. Messina

(57) ABSTRACT

A method for operating at least one electrical component of a vehicle with the aid of a battery. At least two battery cells of the battery are electrically connected and thus added to the at least one component via at least one particular switching unit. The following steps for precharging a DC link of the vehicle is carried out: a) adding a first of the battery cells, b) incrementally adding at least a second of the battery cells, after a previous adding has taken place in each case.

16 Claims, 2 Drawing Sheets

(58) Field of Classification Search
USPC .......................................................... 307/9.1
See application file for complete search history.

(56) References Cited

U.S. PATENT DOCUMENTS

| | | |
|---|---|---|
| 2013/0062891 A1 | 3/2013 | Bourbeau |
| 2013/0293196 A1* | 11/2013 | Butzmann ............... B60L 58/21 |
| | | 320/118 |
| 2016/0197505 A1 | 7/2016 | Butzmann |

FOREIGN PATENT DOCUMENTS

| | | |
|---|---|---|
| DE | 102011003778 A1 | 8/2012 |
| DE | 102012212122 A1 | 1/2014 |
| DE | 102012212646 A1 | 1/2014 |
| DE | 102014203476 A1 | 8/2015 |
| DE | 102015016980 A1 | 8/2016 |

\* cited by examiner

METHOD FOR OPERATING AT LEAST ONE ELECTRICAL COMPONENT OF A VEHICLE

FIELD

The present invention relates to a method for operating at least one electrical component of a vehicle. The present invention furthermore relates to a device for operating at least one electrical component of a vehicle.

BACKGROUND INFORMATION

Conventionally, when starting an electric vehicle, a DC link capacitor is initially charged to avoid harmful power fluctuations from the power electronics to the battery. Since the DC link capacitor is in this case instantaneously connected to the battery, so to speak, very large electric currents may occur during this precharging. They must be transferred to an uncritical range with the aid of a precharging resistor. For this purpose, the electric current is initially guided through the precharging resistor, for example by switching a precharging relay, between the battery and an electric machine of the vehicle. After precharging the DC link capacitor, the relay may bridge the precharging resistor again, so that the current limiting is deactivated.

A battery for an electrical system of a motor vehicle is described in German Patent Application No. DE 10 2015 016980 A1, at least two battery banks being provided. Each of these includes at least one battery cell and a switching element switched in series thereto. Moreover, a precharging device is provided that is designed to precharge a DC link of the electrical system in a first operating mode of the battery.

A so-called soft start system for precharging a DC link is described in U.S. Patent Application Publication No. US 2013/0062891 A1.

SUMMARY

An object of the present invention is to provide a method and a device for operating at least one electrical component of a vehicle. Further features and details of the present invention result from the description herein, and the figures. In this case, the features and the details described in the context of the method according to the present invention naturally also apply in the context of the device according to the present invention and vice versa, so that with regard to the disclosure, reference is and may be made interchangeably to the individual aspects of the present invention.

In accordance with an example embodiment of the present invention, a method for operating at least one electrical component, in particular a driving component, of a vehicle with the aid of a (in particular rechargeable) battery, preferably a high-voltage battery, in particular provides protection. In this case, the electrical component may be implemented as an electrical consumer of an electrical system of the vehicle. Moreover, the electrical component may be designed as a high-voltage component and/or a driving component of the vehicle, such as an electric motor. It is correspondingly possible that the battery is designed as a rechargeable high-voltage battery for supplying the high-voltage component with energy to make it possible for the vehicle to move.

In the case of the method according to an example embodiment of the present invention, it is advantageous if the vehicle is designed as a passenger car or a truck or the like. The vehicle is advantageously designed as an electric vehicle that includes a hybrid drive or exclusively an electric drive. The component may be correspondingly a component of a high-voltage drive train of an electric machine of the vehicle. In the case of electric vehicles of this type, it is therefore possible that a topology including a high-voltage battery pack (i.e., the battery), a DC link and power electronics of the electric machine is provided.

It may be further provided that a DC link, which connects the battery to the component, is initially charged when starting the vehicle and/or when starting an electric motor of the vehicle and/or when starting the component. In this way, harmful power fluctuations and/or ripple effects from power electronics of the vehicle to the battery may be avoided. A DC link capacitor (for example of a DC link capacitor) may be electrically connected to the battery during the start-up, so that large electric currents may generally occur in this case. A discrete precharging resistor for delimiting this current within an uncritical range in the DC link may be potentially dispensed with according to the present invention. Such a precharging resistor and/or further precharging components, such as a DC link relay, is/are usually integrated in the DC link and delimit a current from the battery to the component and/or vice versa (so-called soft start with the aid of precharging).

To optimize the precharging and potentially to be able to dispense with the precharging resistor and/or the further precharging components, it is possible according to the present invention that at least two battery cells of the battery (in particular successively) may be electrically connected and thus added to the at least one component via at least one particular (electric or electronic) switching unit. In other words, the adding may take place through at least one or exactly two switching unit(s) per battery cell. The electrical connection is advantageously used in this case to guide an electric current and to supply the component with energy, the current intensity being a function of (and/or proportional to) the number of the battery cells added thereto.

Here, the subsequent steps for precharging a DC link of the vehicle may be carried out, in particular successively, step b) potentially being carried out multiple times until all battery cells of the battery are added:

a) adding a first of the battery cells,
b) incrementally adding at least a second of the battery cells, after a previous adding has taken place in each case.

In other words, further battery cells, such as a third and fourth and fifth (etc.) of the battery cells may also be successively added in each case, in particular in the same manner as adding the second after the first battery cell. The example method according to the present invention may have the advantage that additional precharging components are saved and the quality of the precharging is improved by a lower probability of failure.

It is moreover advantageous if further battery cells are incrementally added for the purpose of precharging the DC link, preferably at least 5 or at least 10 or at least 20 of the battery cells being successively added. For example, the further incremental adding may be repeated so frequently until a predefined overall voltage of the battery is reached and/or a predefined current intensity of the energy supply is reached and/or all battery cells have been added. In particular, the incremental adding may take place in a delayed manner, so that the overall voltage and/or current intensity is/are increased only slowly.

Furthermore, it may be possible that the incremental adding according to step b) does not take place in each case until an adding condition is available in the case of the previous adding. The adding condition may involve exceeding or falling below or reaching a predefined current intensity that is detected after the previous adding in the current path of the switching unit used for this previous adding. The current intensity may be preferably detected in the current path, in which a coupling switching unit and/or the (last) added battery cell is integrated. The adding condition may also involve reaching a specific time duration, for example in the 1-digit to 3-digit millisecond range. The specific time duration may be ascertained with the aid of a timer of the battery, for example. This makes possible the incremental adding and thus the provision of a soft start.

Within the scope of the present invention, it may be furthermore provided that the incremental adding according to step b) takes place in each case as a function of time and/or current, in particular in a time- and/or current-controlled manner, preferably as a function of an electric current detection in the current path of the switching unit used for this and/or the previous adding and/or as a function of a time measurement. The current detection, in particular the current measurement, may take place with the aid of electronics, for example, which are integrated into the battery. For each battery cell, associated electronics may be preferably integrated into or at the battery cell and/or assigned thereto for the purpose of current detection. These electronics may also assume the control of the adding, i.e., the switchover of the switching unit. This may also take place autarchically, so that the battery is able to control the adding autarchically independently of a battery management system or the like. The electronics are designed as an application-specific integrated circuit.

It may also be advantageously provided that the connection between the battery cells and the component has a parasitic impedance that is used, in particular exclusively, i.e., without the use of a discrete precharging resistor, for current limiting during the precharging. This makes it possible to use natural current limiting, without the need of using additional limiting and/or precharging components.

Within the scope of the present invention, it is furthermore possible that the connection between the battery cells and the component includes an electrical line, which has a length of at least 1 m or at least 1.5 m or at least 2 m, the line preferably being free from interconnected electrical components over this length. In this way, the reliability may be increased and/or the costs of materials may be reduced.

It may be provided within the scope of the present invention that the at least one particular switching unit has at least one coupling switching unit and at least one short circuit switching unit that are assigned to the particular battery cell and switched over alternatingly for the purpose of adding this battery cell. In other words, at least one or exactly two switching units, i.e., the coupling switching unit and the short circuit switching unit, may be assigned to each battery cell. The coupling switching unit may be preferably situated in a current path in series with the battery cell. This allows for the battery cell to be flexibly added. In addition, the advantage may be achieved that the battery cell may be bridged by the short circuit switching unit or may be short-circuited.

According to a further advantage, it may be provided that the incremental adding is repeated for different battery cells in such a way that an overall voltage (for energy supply) provided by the battery for the component is successively increased, preferably until the overall voltage is (essentially) 400 V or 800 V. In particular, by incrementally adding the individual battery cells a maximal charging voltage of 4.2 V to 4.35 V may arise at the DC link (at the battery). This allows for a reliable operation of an electric motor of the vehicle.

Within the scope of the present invention, it is furthermore conceivable that the battery is designed as a high-voltage battery. The latter is used in particular for reliable energy supply of an electric drive of the vehicle.

Furthermore, it is optionally provided that the switching units are integrated into the battery, so that a discrete precharging resistor and/or a DC link relay and/or a DC link switch may be dispensed with in particular for the purpose of precharging. In other words, the precharging may be implemented exclusively by the components that are integrated into the battery. This makes it possible to significantly reduce the technological expenditures for manufacturing the precharging system.

A further object of the present invention is to provide a device for operating at least one electrical component of a vehicle with the aid of a battery. In this case, in accordance with an example embodiment of the present invention, it is provided in particular that the device is suitable for carrying out the method steps of a method according to the present invention. The device according to the present invention thus has the same advantages as the ones described in detail with regard to a method according to the present invention.

Additional advantages, features and details of the present invention are derived from the description below, in which exemplary embodiments of the present invention are described with reference to the figures. The features mentioned in the description may each be important for the present invention either individually or in any arbitrary combination.

DETAILED DESCRIPTION OF EXAMPLE EMBODIMENTS

Figure 1:
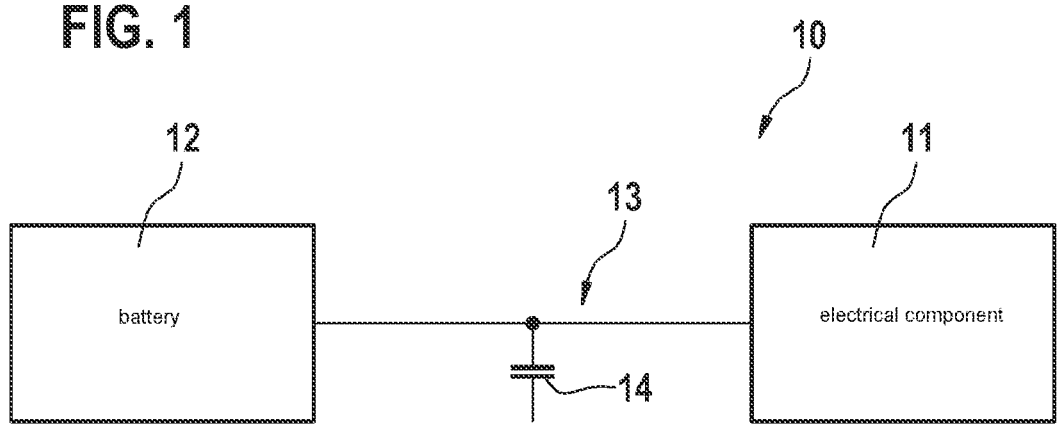
FIG. 1 shows a schematic representation for visualizing a method according to an example embodiment of the present invention.

In the figures, identical reference numerals are also used for the same technical features from different exemplary embodiments.

Figure 2:
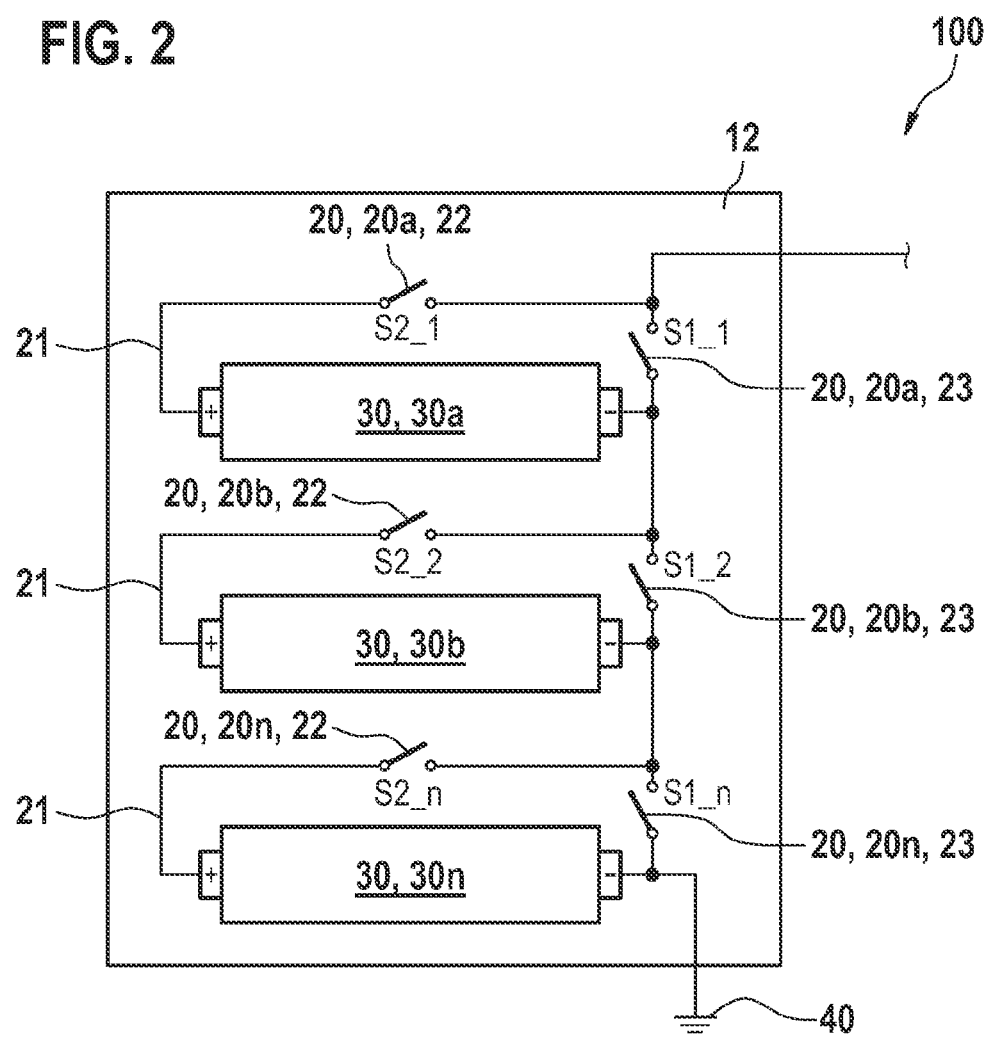
FIG. 2 shows a schematic representation of a device according to an example embodiment of the present invention for visualizing a method according to the present invention.
Figure 3:
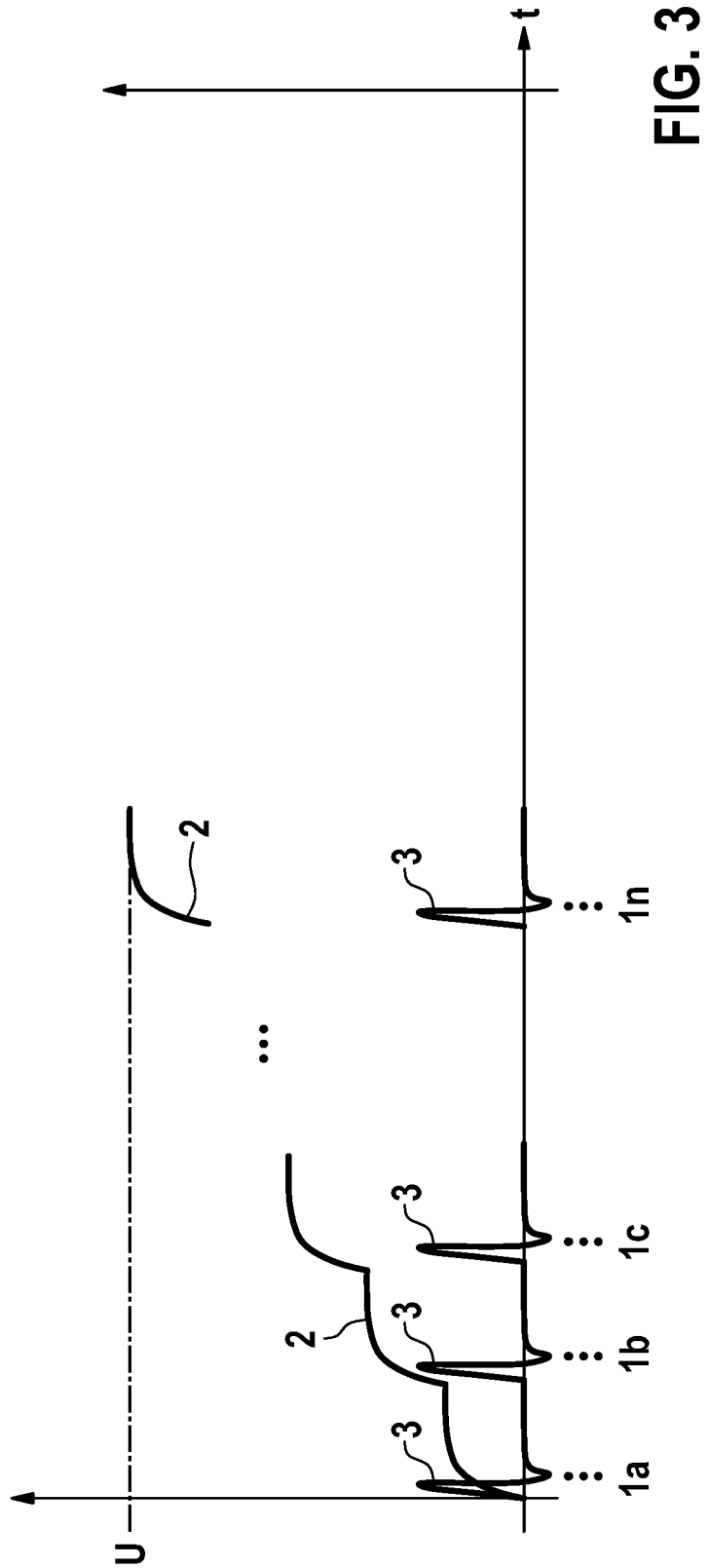
FIG. 3 shows a schematic representation of a sequence of a method according to an example embodiment of the present invention.

Based on FIG. 1 through FIG. 3, a method according to an example embodiment of the present invention for operating at least one electrical component 11 is schematically visualized, component 11 involving a driving component 11 of a vehicle 10 in particular. The latter is supplied with energy by a battery 12, in particular high-voltage battery 12, and operated thereby.

Battery 12 may be connected to component 11 via a DC link 13, DC link 13 having at least one DC link capacitor 14. The DC link capacitance of DC link capacitor 14 is used to avoid harmful current fluctuations. However, when battery 12 is coupled to component 11, very large currents may develop that must be delimited to an uncritical range to prevent a critical operating state. A device 100 according to the present invention and/or a method according to the present invention may be correspondingly used to delimit this current, i.e., to carry out a precharging of DC link 13.

In FIG. 2, a device 100 according to an example embodiment of the present invention for carrying out a method according to an example embodiment of the present invention is shown including further details.

Here, at least two battery cells 30*a*, 30*b* of battery 12 may be electrically connected and thus added to at least one component 11 via at least one particular switching unit 20*a*, 20*b*. For this purpose, it is provided that the following steps are carried out for precharging a DC link 13 of vehicle 10:
adding a first 30*a* of battery cells 30,
incrementally adding at least a second 30*b* of battery cells 30, after a previous adding has taken place in each case.

Battery 12 may include a first battery cell 30*a*, a second battery cell 30*b*, and potentially further battery cells 30 up to an nth battery cell 30*n*. Each of these battery cells 30 may be assigned at least one or at least two or exactly two switching units 20. At least one first switching unit 20*a* may be correspondingly assigned to first battery cell 30*a*, at least a second switching unit 20*b* to second battery cell 30*b* and an nth switching unit 20*n* to nth battery cell 30*n*. (n is any integer in this case.) If each of battery cells 30 is assigned at least two switching units 20, these may also be subdivided into a coupling switching unit 22 and a short circuit switching unit 23. Coupling switching unit 22 is integrated into same current path 21 as battery cell 30 assigned thereto, for example. Short circuit switching unit 23 is integrated together with further short circuit switching units 23 into a current path, for example, which leads from DC link or from component 11 to a ground potential 40. Coupling switching units 22 may connect battery cell 30 assigned thereto to component 11, whereas short circuit switching units 23 may bridge battery cells 30 assigned thereto.

FIG. 2 is to be understood only representatively in this case, so that further battery cells 30 may also be provided and incrementally added for the purpose of precharging DC link 13, at least 5 or at least 10 or at least 20 battery cells 30 being successively added only by way of example. At least one particular switching unit 20 may in particular include at least one coupling switching unit 22 and one short circuit switching unit 23 that are assigned to particular battery cell 30 and that are switched over alternatingly for the purpose of adding this battery cell 30.

According to FIG. 3, it is visualized that the incremental adding does not take place in each case until an adding condition is available in the case of the previous adding. For this purpose, the incremental adding may be carried out in each case as a function of an electric current detection in the current path of switching unit 20 used for this adding until an overall voltage U is reached in particular through a voltage 2 of battery 12.

Now, an exemplary sequence of a method according to the present invention is described, the adding of battery cells 30 required therefor being carried out with the aid of associated switching units 20. FIG. 3 shows an exemplary characteristic of a voltage 2 at the DC link as well as of an electric current 3 in the DC link over time t. In the case of a first adding 1*a*, switching unit S2_1 (shown in FIG. 2) may be initially closed and S1_1 opened. A time duration may then be awaited until current 3 has subsided (i.e., remains at 0 Ampere). The maximal current intensity of current 3 is delimited in this way. This may be carried out in a time-controlled or current-controlled manner with the aid of electronics in battery 12, for example. Subsequently, switching unit S2_2 is closed and switching unit S1_2 is opened upon second adding 1*b*. After having the adding condition available, i.e., the time duration in particular, a third adding 1*c* may also take place. The adding may be carried out multiple times for further battery cells 30 up to an nth adding 1*n*, during which a switching unit S2_*n* is closed and a switching unit S1_*n* is opened. The switching units assigned to a shared battery cell 30 may be opened alternatingly, if necessary, in this case. When all switches S1_1 through S1_*n* are open and correspondingly all switches S2_1 through S2_*n* are closed, the complete DC link voltage is applied and the power electronics start electric motor 11 or component 11.

The above-mentioned elucidation of the specific example embodiments describes the present invention exclusively within the scope of examples. Naturally, individual features of the specific embodiments may be combined freely with one another, if it makes sense technologically, without departing from the scope of the present invention.

What is claimed is:

1. A method for operating at least one electrical component of a vehicle using a battery, at least two battery cells of the battery being electrically connected and thus added to the at least one component via at least one switching unit, the method comprising the following:
precharging a DC link of the vehicle, by:
a) adding a first cell of the battery cells; and
b) incrementally adding at least a second of the battery cells, after a previous adding has taken place in each case;
wherein the incremental adding according to step b) takes place as a function of an electric current detection in a current path of the switching unit used for the previous adding, wherein the electric current detection includes detecting current in the current path of the switching unit using electronics integrated in the battery;
wherein the at least one switching unit is integrated into the battery,
wherein the at least one switching unit is controlled to perform the incremental adding by the electronics integrated into the battery;
wherein the incremental adding of step b) takes place in each case only after a specific time duration has been reached, the specific time duration being ascertained using a timer of the battery.

2. The method as recited in claim 1, wherein further battery cells are incrementally added for the precharging of the DC link, wherein at least 5 of the battery cells being successively added.

3. The method as recited in claim 1, wherein further battery cells are incrementally added for the precharging of the DC link, wherein at least 10 of the battery cells being successively added.

4. The method as recited in claim 1, wherein the incremental adding according to step b) does not take place in each case until an adding condition is available in the case of the previous adding.

5. The method as recited in claim 1, wherein the connection between the battery cells and the component has a parasitic impedance that is used exclusively for current limiting during the precharging.

6. The method as recited in claim 1, wherein the at least one switching unit includes a coupling switching unit and a short circuit switching unit assigned to each battery cell of the battery cells which are switched over alternatingly to add the battery cell.

7. The method as recited in claim 1, wherein the incremental adding is repeated for different battery cells of the battery cells in such a way that an overall voltage provided by the battery for the component is successively increased for supplying energy to the component.

8. The method as recited in claim 1, wherein the incremental adding is repeated for different battery cells of the battery cells in such a way that an overall voltage provided by the battery for the component is successively increased for supplying energy to the component until an overall voltage is 400 V or 800 V.

9. The method as recited in claim 1, wherein the battery is a high-voltage battery.

10. The method as recited in claim 1, wherein the electronics is integrated into each of the battery cells.

11. The method as recited in claim 1, wherein the electronics in integrated at each of the battery cells.

12. The method as recited in claim 1, wherein the electronics includes an application-specific integrated circuit.

13. A device for operating at least one electrical component of a vehicle using a battery, at least two battery cells of the battery being electrically connected and thus added to the at least one component via at least one switching unit, the device configured to:

precharge a DC link of the vehicle, by:
a) adding a first cell of the battery cells; and
b) incrementally adding at least a second of the battery cells, after a previous adding has taken place in each case;
wherein the incremental adding according to b) takes place as a function of an electric current detection in a current path of the switching unit used for the previous adding, wherein the electric current detection includes detecting current in the current path of the switching unit using electronics integrated in the battery;
wherein the at least one switching unit is integrated into the battery, and the at least one switching unit is controlled to perform the incremental adding by the electronics integrated into the battery;
wherein the incremental adding of b) takes place in each case only after a specific time duration has been reached, the specific time duration being ascertained using a timer of the battery.

14. The device as recited in claim 13, wherein the electronics is integrated into each of the battery cells.

15. The device as recited in claim 13, wherein the electronics in integrated at each of the battery cells.

16. The device as recited in claim 13, wherein the electronics includes an application-specific integrated circuit.

* * * * *